(No Model.)

C. B. ALBEE & H. L. WIXSON.
HARNESS.

No. 535,234.   Patented Mar. 5, 1895.

Witnesses
Victor J. Evans.
M. Apgar.

Inventors;
C. B. Albee.
H. L. Wixson
By E. M. Marble & Sons.
Attorneys

UNITED STATES PATENT OFFICE.

CORYDON B. ALBEE AND HALBERT L. WIXSON, OF COLDWATER, MICHIGAN.

HARNESS.

SPECIFICATION forming part of Letters Patent No. 535,234, dated March 5, 1895.

Application filed June 1, 1894. Serial No. 513,182. (No model.)

*To all whom it may concern:*

Be it known that we, CORYDON B. ALBEE and HALBERT L. WIXSON, citizens of the United States, residing at Coldwater, in the county of Branch and State of Michigan, have invented certain new and useful Improvements in Bike-Harnesses; and we do hereby declare the following to be a full, clear, and exact description of the invention, such as will enable others skilled in the art to which it appertains to make and use the same.

Our invention relates to improvements in harnesses, and particularly to improvements in such harnesses as are used with trotting or pacing sulkies, where the effort is to allow the horse as free a movement as possible, and to so adjust the parts of the harness as to equalize the strain, and it consists in an improved bike harness, which will be hereinafter fully described and particularly pointed out in the claims.

The object of our invention is to provide a harness which will allow a trotting or pacing horse a free and easy movement, equalizing the strain to which the horse is put by pulling the sulky, and enabling the horse to be as far as possible perfectly unrestrained in its movements. We aim to take the pulling strain entirely off of the neck, and place it upon the withers, where it can be more easily borne, and to so adjust what will hereinafter be termed the "return straps" that the movement of the horse's hind feet will be more free than is the case with the ordinary breeching attachments, and the power of the hind quarters can be used to better advantage. We also aim to avoid all of the bike or sulky movement which is now present, and to provide means whereby the tendency of pacing horses to move sidewise may be overcome.

Figure 1:
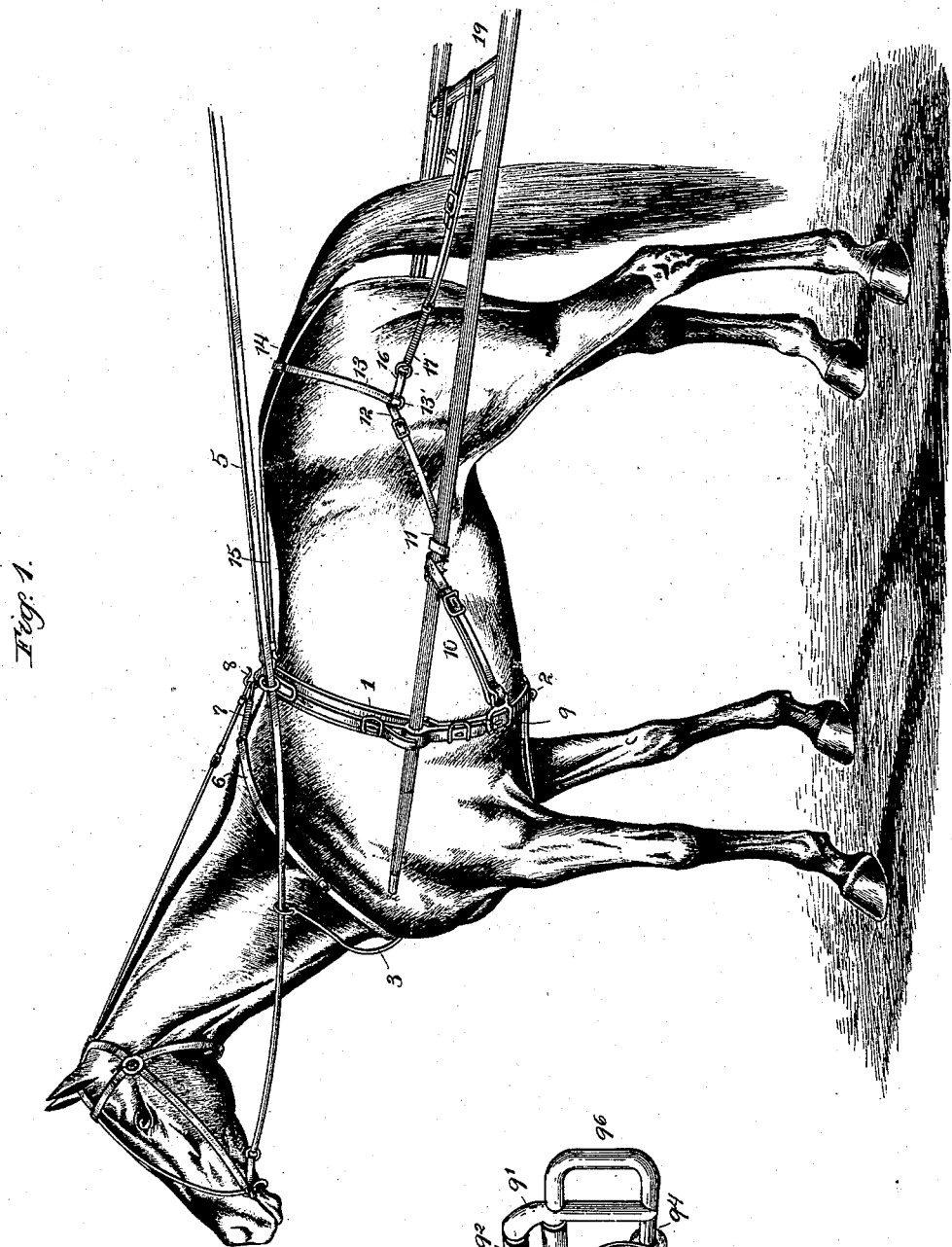
Figure 2:
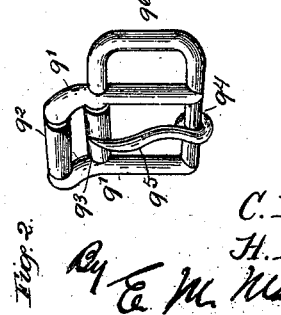

The harness by which we attain the above mentioned objects of invention is fully represented in the drawings which accompany and form a part of this invention, in which—
Figure 1 is a view of a horse with our improved harness in place thereon. Fig. 2 is a view of an improved buckle which we make use of.

Referring to the drawings, 1 represents the girth, which is of the ordinary construction, and is placed upon the horse in the usual manner.

3 is the martingale, and is attached by the ring 2 to the girth and by a suitable ring to the rein 5.

6 is the neck or withers strap, and is attached by a buckle (not shown) to the martingale, and by the coiled spring 7 to the water hook 8. The function of the neck or withers strap is to hold the girth in place, and the reason for attaching said strap to the girth and martingale in the manner described is to prevent the collar from chafing the neck and cutting the mane, and also to transfer what strain there may be upon it from the neck to the withers. The coiled spring acts to render easy and uniform the strain to which the horse is subjected at this point.

In our construction we do not make use of tugs or the ordinary breeching attachments to connect the horse to the sulky, but use instead the following arrangement: About midway from the point of attachment of the martingale to the girth to the position which the thill 11 assumes on the horse we fasten a buckle 9, (which will be hereinafter described in detail.) To this buckle we attach the return strap 10, which is secured to the thill 11. To this thill is also secured the return strap 12, which is attached to a ring 13' fastened to the hip strap 13, which hip strap is attached to the crupper 14 a little back of the point of attachment of said crupper to the back strap 15. Through the buckle 13 also passes the short strap 16, which is attached to the return strap 18 by means of the coiled spring 17. The return strap 18 is either fastened to the thill, or preferably, to the cross piece 19, and we have found by actual experiment that by merely adjusting the return strap 18 along toward the center of the cross bar 19, we are enabled to do away entirely with the pole for pacing horses which are inclined to go sidewise. The point of attachment of the strap 18 to the cross bar 19, can of course, be varied to suit the necessities of each particular horse to which the harness is attached. The point of attachment of the return strap 10 to the girth may be also varied, and may be placed farther down on the girth if desired, but we have found that if placed too far down there is too much upward draft, and that the position shown in the drawings is the best.

The buckle 9, which we use in our harness is shown in detail in Fig. 2. As there shown it consists of two side bars 9', inclined upward at one end, between which pass the cross bars $9^2$, $9^3$ and $9^4$, the bars $9^2$ and $9^3$ being provided with loosely fitting rollers to render more easy the passage of the girth therethrough. The tongue $9^5$ provides for the attachment of the girth. The side pieces $9^6$ provides for attachment of the return strap 10 to the buckle.

We have found that with the harness as thus described, it is possible to materially increase the speed of a trotting or pacing horse. By actual test on one horse we gained four seconds over a mile's trot when this harness was used over the time that was made when the old form of harness, with trace collar and breeching attachments, was used. The strain on the horse is so distributed over its entire body that all of the muscles have comparatively free action. Undue strain and stresses are avoided. The use of the coiled springs serves to equalize the tension, and to render the movement of the horse more easy.

This harness is especially suited for use on pacing horses, but may be used equally as well on other horses; and while we have described it in connection with a sulky, it may also be used with light wagons.

Having thus fully described our invention, what we claim as new, and desire to secure by Letters Patent, is—

1. In a harness, the combination with the girth and the martingale, of a neck or withers strap, passing over the neck of the horse, and attached to said martingale and at its top to said girth, substantially as described.

2. In a harness, the combination with the girth having a water hook thereon and a martingale, of a neck or withers strap attached to said martingale, and attached to said water hook by a spring attachment, substantially as described.

3. In a harness, the combination with the girth 1, the thill 11, the back strap 15, the crupper 14, and the hip straps 13 attached to the crupper in the rear of the point of attachment of the crupper to the back strap, of the return straps 10 extending from the girth to the thill, the return straps 12 extending from the thill to the hip straps, and return straps extending from said hip straps either to the thill or to the cross bar 19, substantially as described.

4. In a harness, the combination with the girth 1, the thill 11, the back strap 15, the crupper 14, and the hip straps 13 attached to the crupper in the rear of the point of attachment of the crupper to the back strap, of the return straps 10 extending from the girth to the thill, the return straps 11 extending from the thill to the hip straps, and a spring connection between said hip straps and the thill or the cross bar 19, substantially as described.

5. In a harness, the combination with the girth 1, the thill 11, the back strap 15, the crupper 14, and the hip straps 13 attached to the crupper in the rear of the point of attachment of the crupper to the back strap, of the return straps 10 extending from the girth to the thill, the return straps 11 extending from the thill to the hip straps, and the short straps 16, the springs 17, and the return straps 18 connecting said hip straps either with the thill or the cross bar 19, substantially as described.

In testimony whereof we affix our signatures in presence of two witnesses.

CORYDON B. ALBEE.
HALBERT L. WIXSON.

Witnesses:
LEONARD F. HUMPHREY,
GEORGE E. HANLEY.